(12) United States Patent
Rameshni et al.

(10) Patent No.: US 8,465,722 B2
(45) Date of Patent: Jun. 18, 2013

(54) THERMAL REDUCTION OF SULFUR DIOXIDE TO SULFUR WITH TEMPERATURE CONTROLLED FURNACE

(75) Inventors: Mahin Rameshni, Monrovia, CA (US); Stephen L. Santo, La Crescenta, CA (US)

(73) Assignee: Rameshni & Associates Technology & Engineering, Monrovia, CA (US)

( * ) Notice: Subject to any disclaimer, the term of this patent is extended or adjusted under 35 U.S.C. 154(b) by 0 days.

(21) Appl. No.: 13/164,729

(22) Filed: Jun. 20, 2011

(65) Prior Publication Data

US 2012/0321548 A1 Dec. 20, 2012

(51) Int. Cl.
*C01B 17/02* (2006.01)
*C01B 17/04* (2006.01)

(52) U.S. Cl.
USPC ........................................ 423/569; 423/574.1

(58) Field of Classification Search
USPC .............................................. 423/569, 574.1
See application file for complete search history.

(56) References Cited

U.S. PATENT DOCUMENTS

| 4,207,304 | A | * | 6/1980 | Beavon | 423/569 |
| 4,452,772 | A | * | 6/1984 | Knoblauch et al. | 423/569 |
| 4,695,444 | A | * | 9/1987 | Grochowski et al. | 423/569 |
| 7,261,873 | B2 | * | 8/2007 | Jia et al. | 423/569 |

* cited by examiner

*Primary Examiner* — Timothy Vanoy

(57) ABSTRACT

Processes for the thermal reduction of sulfur dioxide to elemental sulfur are disclosed. The processes described include three general reaction sections, including the reaction furnace portion where the $SO_2$-containing stream is combusted, the second reaction zone where the temperature is moderated to encourage the reaction of sulfur with hydrogen to consume the hydrogen carbon monoxide and produce the $H_2S$ and CO. The temperature moderation is achieved by one or combinations of three different methods adding external waste heat boiler, followed by a vessel to provide adequate residence time for the reaction of producing $H_2S$ or to recycle the tail gas to a second zone of a 2-zone reaction furnace, using inter-stage internal cooling coil or adding a quench fluid in the second zone of a 2-zone reaction furnace. The third reaction zone is a Claus conversion portion, wherein residual $H_2S$ and $SO_2$ are further reacted to produce additional elemental sulfur.

20 Claims, 3 Drawing Sheets

THERMAL REDUCTION OF SULFUR DIOXIDE TO SULFUR WITH TEMPERATURE CONTROLLED FURNACE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

This disclosure relates generally to processes for the production of elemental sulfur from sulfur dioxide, and more particularly to processes for the thermal reduction of sulfur dioxide, such as that from effluent streams, to elemental sulfur by controlling furnace temperature to minimize side reactions.

DESCRIPTION OF THE RELATED ART

Sulfur dioxide is found in many industrial gases emanating from plants involved in roasting, smelting and sintering sulfide ores, or gases from power plants burning high sulfur coal or fuel oils or other sulfurous ores or other industrial operations involved in the combustion of sulfur-bearing fuels, such as fuel oil. One of the more difficult environmental problems facing industry is how to economically control $SO_2$ emissions from these sources.

One of the approaches is the recovery of sulfur dioxide from such gases and related waste streams, preferably in the form of elemental sulfur which may be reused to an economic advantage, especially as it may be stored and transported less expensively than other reduction products.

The reduction of sulfur dioxide, including its reduction to elemental sulfur, has been investigated extensively over the years. In fact, a number of processes are known for the reduction of sulfur-dioxide containing gases and gas streams to elemental sulfur. One proposed process, suggested in German patent application No. 2,365,116, describes a process for reducing sulfur dioxide-containing gases with relatively pure hydrogen at temperatures greater than 600° C. without the use of a reduction catalyst. Due to this process requiring relatively pure hydrogen gas, this process is relatively expensive, and may not be appropriate for large-scale reduction processes.

Several processes schemes have been developed to recover elemental sulfur from $SO_2$ streams. There are several fundamental problems common to these efforts. In particular, byproduct formation of $H_2S$, $CS_2$, COS, $H_2$ and CO reduces sulfur recovery and fuel efficiency and requires larger equipment because of the increased gas flow. Soot formation reduces the quality of the sulfur product and fouls the equipment and catalyst beds reducing the reliability of the unit.

Thermal Reduction of $SO_2$ to Sulfur was developed during 1909-11. S. W. Young investigated reduction of $SO_2$ with methane and other hydrocarbons on a laboratory scale, (Fleming, E. P., and Fitt, T. C., High Purity Sulfur from Smelter Gases—Reduction with Natural Gas, Ind. Eng. Chem., 42, 2249-2253, November 1950).

In a 1934 article, Yushkevich, and others, discuss in detail the various possible reaction products from the combination of $SO_2$ and a hydrocarbon reducing agent, including $H_2S$, COS, $CS_2$ and sulfur. Experiments suggested 900-1000° C. as the optimum temperature. (Yushkevich et al, Article Z H. KHIM. PROM., No. 2, 33-37, 1934 and U.S. Pat. No. 3,928,547, Process for the Reduction of Sulfur Dioxide, Daley, W. D., Wilkalis, J. E., and Pieters, W. J. M., Allied Chemical Corp., Dec. 23, 1975).

In 1938, American Smelting and Refining Company (ASARCO) initiated investigations, which soon indicated that relatively low-grade $SO_2$ might be directly converted to reasonably pure sulfur by reduction with natural gas. (Fleming, E. P., and Fitt, T. C., High Purity Sulfur from Smelter Gases—Reduction with Natural Gas, Ind. Eng. Chem., 42, 2249-2253, November 1950). Laboratory and small-scale pilot operations were gradually expanded until a semi-commercial 5-tpd unit was operated during 1940-45. Gas from copper roasters or converters containing 5-8% $SO_2$ and 9-12% oxygen was combusted with sufficient natural gas to consume all the oxygen to $CO_2$, plus additional fuel to react with an appropriate portion of the $SO_2$ according to the following overall reaction with $CH_4$ as shown in the following reaction:

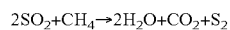

$$2SO_2 + CH_4 \rightarrow 2H_2O + CO_2 + S_2$$

Thermal Reduction of $SO_2$ was further developed in the 1980s. In a 1980 patent, a hydrocarbon fuel, gaseous or liquid, is partially oxidized in a reaction furnace to generate $H_2$ and CO and $SO_2$ added to the second flame zone to react with the $H_2$ and indirectly, CO (by virtue of water gas shift to $CO_2$ and $H_2$). The firing rate is adjusted to yield a mixture of $H_2S$ and $SO_2$ in the molar ratio of 2:1 as required by Claus stoichiometry (U.S. Pat. No. 4,207,304, Beavon, D. K., Process for Sulfur Production, Ralph M. Parsons Company, Jun. 10, 1980). One disadvantage is that introduction of $SO_2$ to the second flame zone increases hydrocarbon fuel consumption.

In similar application, (U.S. Pat. No. 7,722,852 B2, May 25, 2010, Rameshni, M.) describes a process for the thermal reduction of sulfur dioxide to sulfur. An expensive cobalt molybdenum hydrogenation catalyst in a fixed bed catalytic reactor is employed to consume excess $H_2$ and CO produced in the reaction furnace. In some cases a recycle is required to moderate the temperature rise in the catalyst bed.

Other approaches described in the art have utilized interesting methodologies, but methodologies which nonetheless are often not applicable to large-scale process situations, are cost inefficient, result in the formation of other, non-desirable products, or do not have high recovery and/or product quality values. For example, one reported process for the conversion of elemental sulfur to sulfur dioxide involves the reduction with a carbonaceous material such as cola, wood, or petroleum coke in a reaction zone containing a molten salt, such as sodium or potassium sulfide. Another approach to solving the problem at hand includes the reduction of sulfur dioxide (from an off-gas) to elemental sulfur via a process of converting the sulfur dioxide to sulfur by passing a sulfur dioxide-containing off-gas through a reactor containing a mixture of fresh and recycled coal. Finally, biological processes, such as those reported in U.S. Pat. No. 5,269,929, have been suggested, proposing the microbial reduction of sulfur dioxide to hydrogen sulfide using sulfate reducing bacteria in co-culture with anaerobic heterotrophs, such as the sulfate reducing bacteria belonging to the genera *Desulfovibrio* and the like, under anaerobic conditions. Reportedly, the $SO_2$ converted by the microorganisms to $H_2S$ may then be reacted with some remaining $SO_2$ in a Claus reactor in order to produced elemental sulfur, as desired. However, the applicability of this process to industrial-scale processes has not yet been shown.

This application for patent discloses processes for the thermal reduction of sulfur dioxide to elemental with a temperature controlled reaction furnace zone to minimize the formation of byproduct $H_2$ and CO.

BRIEF SUMMARY OF THE INVENTION

The present invention relates to a process for recovering sulfur from sulfur dioxide ($SO_2$) containing gases. More particularly to processes for the thermal reduction of sulfur dioxide, such as that from effluent streams, to elemental sulfur with a temperature controlled furnace. Key advantages are reduced byproduct $H_2$ and CO, reduced fuel consumption, no need for expensive catalyst, and reasonable operating and capital costs.

In accordance with aspects of the present invention, the process comprises at least 3 reaction zones: a first reaction furnace zone, a second reaction furnace zone, and a Claus conversion zone. In the first reaction furnace zone a reducing agent, for example natural gas, is combusted with $SO_2$ and oxygen at a first elevated temperature. In the second reaction furnace zone, $H_2$ and CO are consumed at a second elevated temperature. In the Claus conversion zone $H_2S$ and $SO_2$ react to form elemental sulfur.

In accordance with further aspects of the present invention, the process comprises contacting a reducing agent with oxygen and $SO_2$ in a first reaction furnace zone at a temperature ranging from about 1100° C. to 1400° C. for a period of time sufficient to produce an effluent stream comprising sulfur, $H_2O$, $H_2$ and CO; reducing the temperature of the effluent stream to a temperature ranging from about 600° C. to 1100° C.; holding the cooled effluent stream in a second reaction furnace zone for a period of time sufficient for completion of reactions of $H_2$ with sulfur and CO with sulfur and $H_2O$; cooling the second reaction furnace zone effluent gas to recover sulfur; contacting the cooled effluent gas in a Claus conversion zone comprising a fixed bed catalytic reactor which contains an activated catalyst at a temperature ranging from about 165° C. to 400° C. to convert $H_2S$ and $SO_2$ to sulfur, cooling the effluent gas to recover additional sulfur.

In accordance with one embodiment addition of the present invention, hydrocarbon gas is combusted with $SO_2$ and oxygen in a first reaction furnace at a temperature of 1100° C. to 1400° C. The effluent gas is cooled in a first heat exchanger, for example, a waste heat boiler, to a temperature ranging from about 600° C. to 1100° C. The cooled gas enters a second reaction furnace for a period of time sufficient for reactions of $H_2$ with sulfur and CO with sulfur and $H_2O$ to form $H_2S$. The effluent gas from the second reaction furnace is cooled in a second waste heat boiler and sulfur condenser to recover elemental sulfur. The effluent gas from sulfur condenser is treated in one or more Claus conversion stages comprising a reheater, converter and condenser to produce and recover additional sulfur.

In accordance with another embodiment of the present invention, hydrocarbon gas is combusted with $SO_2$ and oxygen in a first reaction furnace at a temperature of 1100° C. to 1400° C. The effluent gas mixed with a cooler recycle stream to produce a cooled gas with a temperature ranging from about 600° C. to 1100° C. The cooled gas enters a second reaction furnace for a period of time sufficient for reactions of $H_2$ with sulfur and CO with sulfur and $H_2O$ to form $H_2S$. The effluent gas from the second reaction furnace is cooled in a waste heat boiler and sulfur condenser to recover elemental sulfur. The effluent gas from sulfur condenser is treated in one or more Claus conversion stages comprising a reheater, converter and condenser to produce and recover additional sulfur. A portion of the effluent gas from the waste heat boiler or sulfur condensers is recycled to the outlet of the first reaction furnace.

In accordance with another embodiment of the present invention, hydrocarbon gas is combusted with $SO_2$ and oxygen in a first reaction furnace at a temperature of 1100° C. to 1400° C. A quench fluid, for example water or steam is introduced to produce a cooled gas with a temperature ranging from about 600° C. to 1100° C. The cooled gas enters a second reaction furnace for a period of time sufficient for reactions of $H_2$ with sulfur and CO with sulfur and $H_2O$ to form $H_2S$. The effluent gas from the second reaction furnace is cooled in a waste heat boiler and sulfur condenser to recover elemental sulfur. The effluent gas from sulfur condenser is treated in one or more Claus conversion stages comprising a repeater, converter and condenser to produce and recover additional sulfur.

In further accordance with aspects of the present disclosure, the activated catalyst in the Claus conversion zone is an alumina, titania, or a mixed bed with alumina on the top and a layer of titania and/or a layer of cobalt-molybdenum catalyst on the bottom of the reactor separated by the Claus catalyst supports, which promotes a Claus reaction in the reactor, consumes residual hydrogen, and produces additional hydrogen sulfide and carbon dioxide by hydrolysis. In still further accordance with the present disclosure, residual effluent streams comprising $H_2S$ and/or $SO_2$ may be further contacted with one or more additional catalytic process stages in order to produce additional elemental sulfur. Such additional catalytic process stages may employ alumina and/or titania catalysts or their equivalents.

BRIEF DESCRIPTION OF THE DRAWINGS

The following figures are part of the present disclosure and are included to further illustrate certain aspects of the present invention. Aspects of the invention may be understood by reference to one or more figures in combination with the detailed written description of specific embodiments presented herein.

Figure 1:
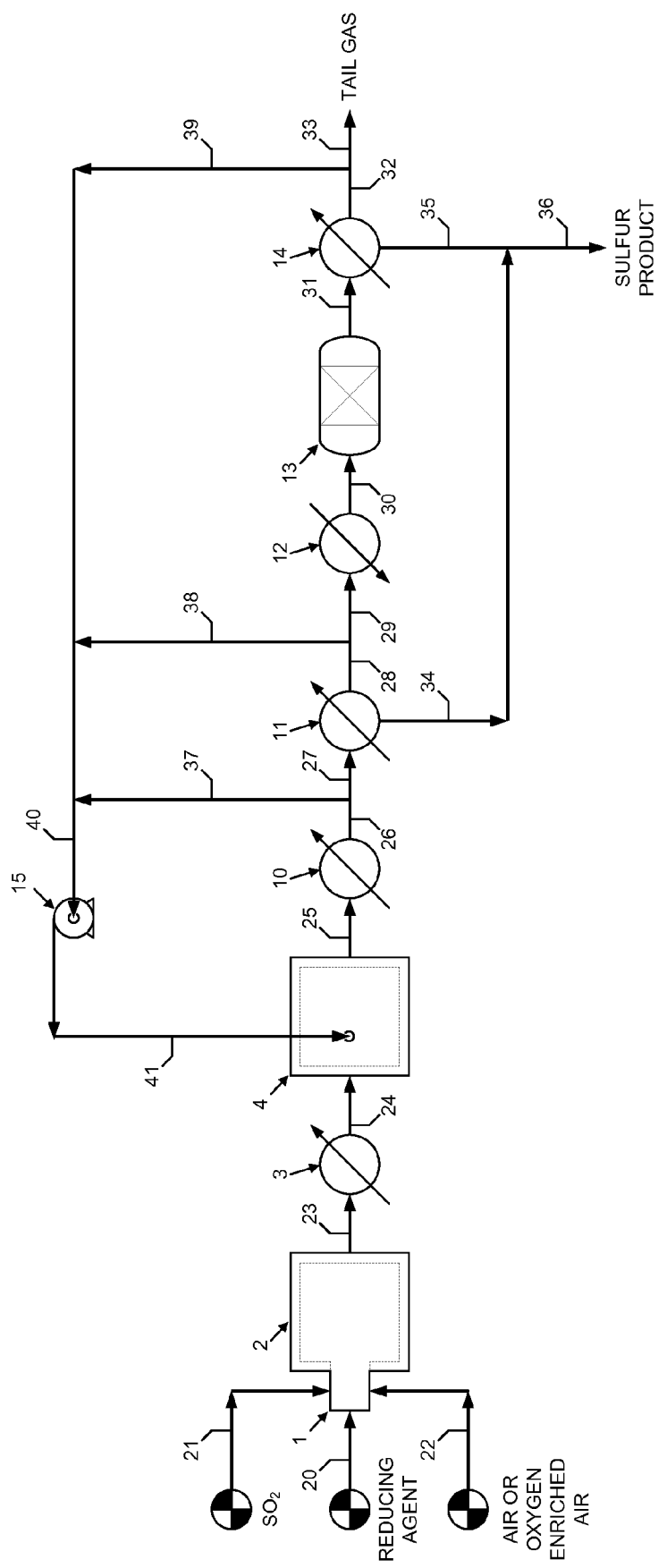
FIG. 1 illustrates a schematic diagram of an embodiment of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new processes for the thermal reduction of sulfur dioxide ($SO_2$) to elemental sulfur having high purity and in both reasonable economic costs and amount of sulfur recovered.

The present invention relates to processes for recovering sulfur from sulfur dioxide ($SO_2$) containing waste streams using thermal reduction methods. Key advantages of the processes described herein include lower fuel consumption and favorable operability parameters (e.g., reasonable capital and operating costs), reduced emissions, better sulfur product quality (post-recovery), increased sulfur recovery efficiency, and better operational stability. Depending upon the quantity of $SO_2$, the concentration of the $SO_2$, the presence of impurities and/or the oxygen content of the $SO_2$-containing waste stream, the stream may or may not be concentrated by one or more known concentration processes prior to introduction into the process of the present disclosure. The present invention has the advantages of being able to handle any $SO_2$ concentration to the first reaction zone without causing soot formation which the quality of the liquid sulfur is improved and use of expensive catalyst is eliminated.

In accordance with aspects of the present invention, it is an object of the present disclosure to provide a process for producing elemental sulfur from sulfur dioxide-containing gases and waste streams containing sulfur dioxide in high overall recovery yields, and with a minimum number of process steps. A further object of the present disclosure it to provide such a process which results in a minimum number of formed byproducts, which would otherwise require further treatment and/or disposal.

A further object of the present disclosure is the provision of an efficient process for converting sulfur dioxide to elemental sulfur in amounts required in, and economically acceptable for, present day industrial operations. Another object is to provide such a process which can tolerate variances in operating conditions within a given range without major equipment adaptations. A further object is to provide a process which can be utilized in co-acting phases to provide, at acceptable economics, the capacity required in present-day industrial operations.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, heating and cooling of the process streams are known to those of skill in the art, and may be employed in the processes of the present invention, without deviating from the disclosed inventions.

Turning now to the figures, in FIG. 1, in the first reaction furnace zone, a waste stream comprising $SO_2$ (21), a gas stream comprising oxygen (22), such as air, oxygen-enriched air, or substantially pure oxygen, and a reducing agent (20), comprising gaseous hydrocarbons, such as natural gas or the like, are conveyed into a burner (1). The gaseous mixtures may be separately preheated to a temperature ranging from about 150° C. up to about 350° C. in preheaters (not shown). In accordance with the present disclosure, it is not required to heat any of the gaseous streams entering the first reaction furnace zone burner. However, in order to reduce the fuel consumption of the hydrocarbon stream, and in order to reduce the cost of fuel as well as increase the economic desirability of the presently disclosed processes, it may be preferred in some cases to use preheaters to raise the temperature of the respective gas streams prior to their entrance into reaction furnace burner (1). With continued reference to FIG. 1, the heated gaseous hydrocarbon stream, $SO_2$-containing waste stream, and heated oxygen-containing stream are combined and admixed in the reaction furnace burner (1) portion of the first reaction furnace zone, and are then conveyed into the first reaction furnace (2). The reaction furnace is typically a carbon steel vessel with an internal lining comprising high alumina refractory.

The sulfur dioxide ($SO_2$) stream (21) is preferably a waste stream effluent comprising a molar concentration of $SO_2$ ranging from about 1% to about 100%, which can come from any number of suitable $SO_2$ sources, including but not limited to the numerous gases emanating from plants involving roasting, smelting, and sintering of sulfide-containing ores; gases from power plants burning high sulfur coal, fuel oils, or other sulfurous ores; industrial operations involved in the combustion of sulfur-bearing fuels, such as fuel oil; tail gas streams from any number of process plants, the condensation of enriched stripper gases, tail gas effluent, and the like; from the combustion of fossil fuels; from the burning of crude oils; from the smelting of sulfide ores such as iron pyrites and sphalerite (zinc blende); and heating calcium sulfate (gypsum) with coke and sand in the manufacture of cement.

In accordance with an aspect of the present invention, the $SO_2$ stream (21) is preferably pretreated to remove particulate material and concentrate the stream to a molar concentration ranging from about 25% to about 100% before entering the unit, although removal of particulates and concentration is not necessary for operation of the presently described process.

In accordance with the present disclosure, reducing agent (20) may comprise a hydrocarbon such as methane (CH4) or a hydrocarbon mixture, The amounts of reducing agent, oxygen, and $SO_2$ comprising effluent streams fed to the unit may be controlled so as to maintain the mole ratio of $H_2S$ to $SO_2$ in the tail gas stream of the overall process. It is presently preferred that the $H_2S$ to $SO_2$ mole ratio be controlled so as to be in a range from about 2:1 to about 10:1, and more preferably from about 2:1 to about 5:1, although ratios outside of these ratios may be appropriate, depending upon the overall setup of the production process.

The reaction between the $SO_2$-containing effluent stream, oxygen-containing gas, and heated hydrocarbon continues within the first reaction furnace (2), wherein the stream that contains hydrocarbon is combusted to generate hydrogen gas ($H_2$) and CO, resulting in the hydrogenation of $SO_2$ to $H_2S$ with subsequent thermal conversion of $H_2S$ and residual $SO_2$ to sulfur, according to the Claus reaction. The thermal reduction conducted within in the first reaction furnace (2) occurs at temperatures ranging from about 1100° C. to 1400° C., and more preferably from about 1200° C. to about 1300° C. It has been found that at temperatures below 1100° C., combustion of the hydrocarbon reducing agent is not complete resulting in tar-like substances that foul downstream equipment and produce poor quality sulfur. At temperatures above 1400° C., the hydrocarbons in the reducing agent tend to crack to form elemental carbon which also fouls downstream equipment and produces poor quality sulfur. Operation of the reaction furnace in the temperature range from 1100° C. to 1400° C. results in significant byproduct $H_2$ and CO in the first reaction furnace effluent stream (23) which if not consumed would increase the fuel demand of the process.

With continued reference to FIG. 1, the first reaction furnace effluent gas stream (23) is cooled in the first waste heat boiler (3) to a temperature ranging from about 600° to 1100° C. The figure illustrates a waste heat boiler that produces steam, however, any suitable heat exchanger, such as a water heater, steam superheater or feed effluent exchanger may be employed in this service.

The first waste heat boiler effluent stream (24) is introduced to the second reaction furnace (4) wherein the temperature is maintained in the range from 600° C. to 1100° C., preferably in the range from 600° C. to 800° C., to effect reaction between $H_2$ and sulfur and CO and sulfur and water. It has been found that in this temperature range, significant amounts of $H_2$ and CO are consumed and near equilibrium conditions are attained in from 0.1 to 10 seconds depending on the temperature. At lower temperatures longer time is required to reach equilibrium (Dowling and Hyne, "Optimizing Hydrogen Concentration in Oxygen Blown Claus Plant", Presented at AICHE, 1988).

The residence time in the second reaction furnace (4) is preferably from 0.2 to 5 seconds, and more preferably from 0.5 to 2 seconds, to allow the reactions involving $H_2$ and CO to approach equilibrium. Conversion of more than 80%, preferably more than 90%, of the $H_2$ and CO on a molar basis can be achieved. The second reaction furnace is a carbon steel vessel with an internal refractory lining or other suitable reaction vessel and may be the reversing chamber of a two-pass waste heat boiler. The second reaction furnace effluent gas (25) then enters the second waste heat boiler (10) to cool the gas further before entering the first condenser (11).

With continued reference to FIG. 1, the exiting second reaction furnace effluent gas (25) is cooled in the second waste heat boiler (10) and the second waste heat boiler effluent gas stream (27) enters the first condenser (11) wherein the gas is further cooled to a temperature ranging from about 130° C. to 200° C. and sulfur is condensed and recovered. The first condenser liquid sulfur (34) may be collected in a sulfur pit or other suitable vessel, located either below or above grade. The first condenser effluent gas stream (28) enters the first repeater (12) wherein the gas is heated to a temperature appropriate for the reaction of $H_2S$ and $SO_2$ to form sulfur and the hydrolysis of COS and $CS_2$ to $H_2S$ and $CO_2$, preferably in the range from 165° C. to 400° C. Any type of suitable reheater device or method may be employed, such as an indirect steam reheat, hot gas bypass, or inline burner.

The first reheater effluent stream (30) enters the first converter (13), which comprises one or more fixed bed reactors containing a catalyst.

The first converter catalyst comprises at least one Claus catalyst, such as alumina, or titania. A layer of Co/Mo (cobalt-molybdenum) catalyst may be used at the bottom of the reactor to scavenge any remaining $H_2$ and CO.

The effluent gas stream (31) exiting from catalytic reactor no. 1 (13) is cooled to an appropriate temperature, e.g., to a temperature ranging from about 130° C. to about 200° C., in the second sulfur condenser (14) to produce condensed elemental sulfur (35), which is then conveyed to sulfur pit as described above in reference to the first sulfur condenser (11).

The gas effluent (32) from the second sulfur condenser (14) may be treated in one or more additional stages, comprising a repeater, converter and condenser to recover additional sulfur or may be processed in any other tail gas treatment unit commonly used to treat Claus unit tail gas streams.

A portion of the tail gas stream from the first waste heat boiler (37) or second waste heat boiler (38) or the first condenser outlet (39) may be recycled stream (40) to the second reaction furnace (4) through a recycle blower or ejector (15), to moderate the temperature. Such a recycle is not a requirement of the process but may provide better control of the second reaction furnace temperature over the complete operating range from turndown to maximum capacity than a waste heat boiler alone.

The converters in the Claus conversion step of this present process disclosure, employ one or more Claus catalysts including alumina catalysts, activated alumina catalysts (such as S-100 SR catalysts), alumina/titania catalysts, and/or titania catalysts, or any other catalyst systems which are employed in the Claus process., the catalysts having a range of surface area, pore volume, shapes (e.g., star shaped, beads, or powders), and percent catalyst content (in non-limiting example, from about 50 wt. % to about 95 wt. % $Al_2O_3$, having a purity up to about 99+ %), without any limitations. The Claus processes within converter and subsequent converters, such as converter may be carried out at conventional reaction temperatures, ranging from about 200° C. to about 1300° C., and more preferably from about 240° C. to about 600° C., as well as over temperature ranges between these ranges, including from about 210° C. to about 480° C., and from about 950° C. to about 1250° C., without limitation.

The number of Claus conversion steps employed, which may range from one stage to more than ten, depends on the particular application and the amount of sulfur recovery required or desired. In accordance with certain non-limiting aspects of the present disclosure, the number and placement of multiple converters/reactors, and the associated condenser systems, may be adjusted without affecting the overall thermal reduction process described herein.

The process is typically able to achieve an overall sulfur recovery efficiency of greater than about 80%, and preferably greater than about 90%, based on the theoretical amount of recoverable sulfur. For example, the sulfur recovery efficiency may be about 95% (or more) with an initially-concentrated $SO_2$-containing waste stream and three Claus conversion stages.

With continued reference to FIG. 1, the tail gas stream (33) upon exiting the last reaction stage, may optionally be conveyed to any typical tail gas absorption process, sub dew point process or any type of incineration process to increase sulfur recovery efficiency to about 100%.

As described herein, the liquid sulfur recovered by the disclosed processes (36) is typically collected in a sulfur pit or other appropriate collection device or approved location, and may removed as appropriate, such as by a sulfur pump or pump system to be handled by others, or shipped as appropriate.

Figure 2:
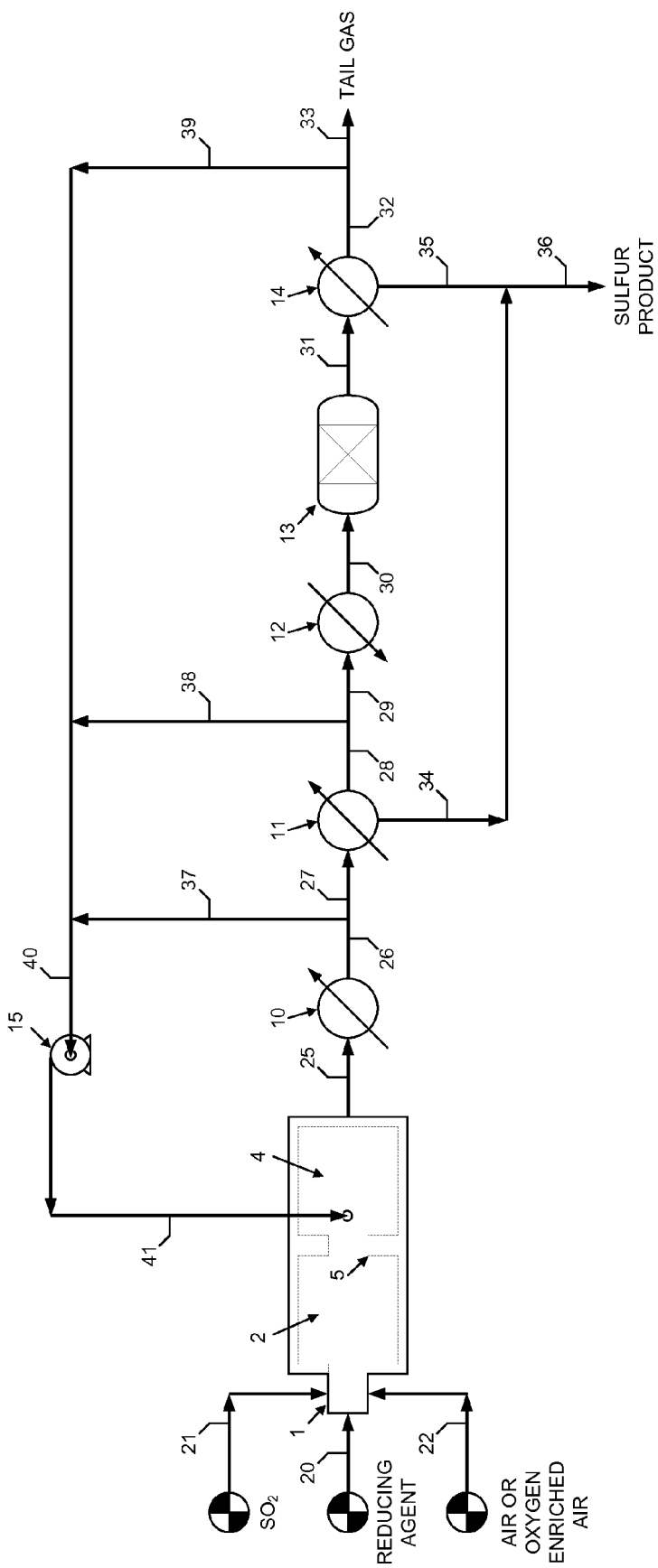
FIG. 2 illustrates a schematic diagram of an alternate embodiment of the present disclosure.

Turning to FIG. 2, where the first reaction zone (2) is the same as FIG. 1 and the difference is in the second reaction zone (4). The second reaction zone is a second zone of a 2-zone reaction furnace (4) which is designed to have an adequate residence time to mix the gas stream from the first reaction zone with a recycle tail gas stream (41) to moderate the mixed temperature and by allowing adequate residence time to consume the hydrogen and maximize the H₂S and CO₂ production.

As further illustrated in FIG. 2, a portion of the tail gas from waste heat boiler outlet or any of the sulfur condenser gas stream may be recycled, as an via a low-head centrifugal recycle blower or ejector (15) to a second zone of the 2-zone reaction furnace (4).

As further illustrated in FIG. 2, a 2-zone reaction furnace (2, 4) is separated by a refractory choke ring or checker (5) in a carbon steel refractory vessel where to promote a turbulent velocity for good mixing of both gases from the first reaction zone with the tail gas recycle (41).

Figure 3:
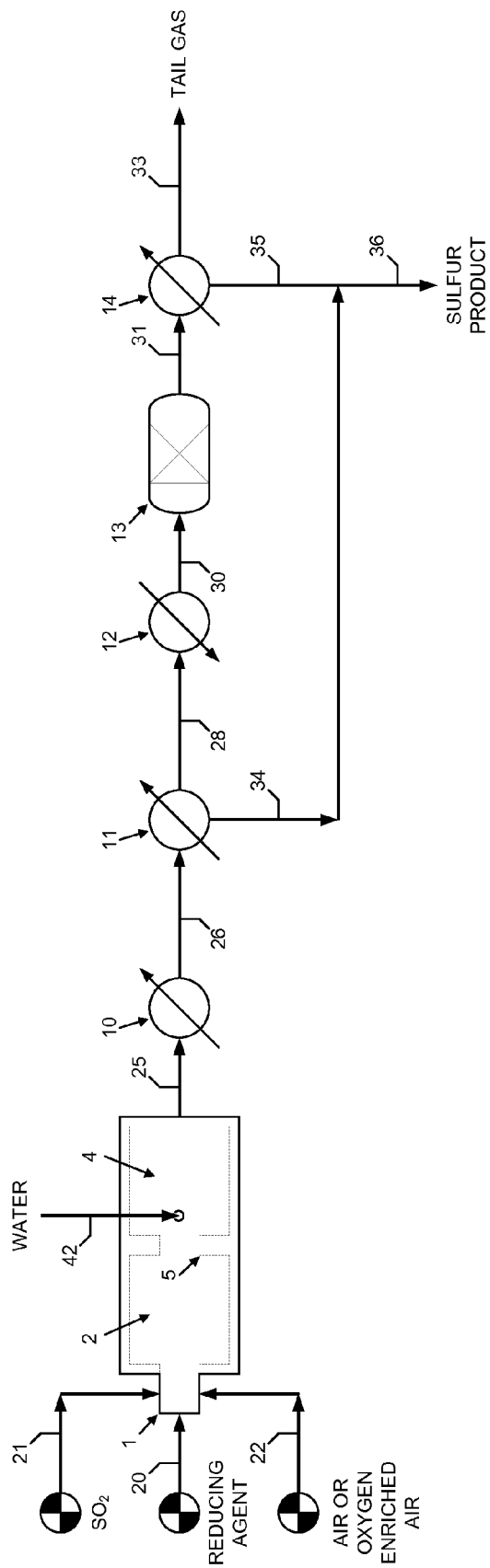
FIG. 3 illustrates a schematic diagram of an alternate embodiment of the present disclosure.

Turning to FIG. 3, where the concept of the invention is the same, with a difference of adding a quench fluid (42), such water or steam, to the second zone of reaction furnace (4) to eliminate or to reduce the tail gas recycle stream.

Accordance to this invention, any method of controlling temperature mentioned above could be used separately or in a combination of any of three.

The three methods of controlling the temperature in the second reaction zone of this invention is to maximize the hydrogen and carbon monoxide consumption and to produce the H₂S and CO₂ in a optimum temperature and adequate residence time and combination of any three methods could be applied to obtain desirable conversions in the second reaction zone.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents.

We claim:

1. A process for the production of sulfur from sulfur dioxide ($SO_2$)-containing effluent streams, the process comprising:
   contacting an oxygen containing gas stream with a sulfur dioxide-containing gas stream and a hydrocarbon gas stream in a first reaction furnace at a first elevated temperature for a period of time sufficient to produce an effluent stream comprising sulfur (S), hydrogen, CO, and water;
   cooling the effluent gas stream to a second elevated temperature;
   providing adequate residence time at the second elevated temperature in a second reaction furnace to consume the hydrogen and CO;
   contacting the effluent gas stream from the second reaction furnace with one or more Claus catalytic reaction zones comprising one or more catalysts; and,
   recovering the elemental sulfur from the product gas stream.

2. The process of claim 1, wherein the second reaction zone comprises two waste boilers and a carbon steel refractory vessel is located between these waste heat boilers as a separate vessel or as the reversing chamber of waste heat boiler.

3. The process of claim 1, wherein, the second reaction zone is the second zone of a 2-zone reaction furnace where separated from the first zone which is part of the first reaction zone with choke ring or checker wall.

4. The process of claim 1, wherein, the second reaction zone temperature is maintained at 600° C. to 1100° C.

5. The process of claim 1, wherein, a portion of the tail gas from the waste boiler outlet or from any of the sulfur condensers is recycled to the second reaction zone, to moderate the temperature.

6. The process of claim 1, wherein the first waste heat boiler is an inter-stage internal cooling coil is installed in second reaction zone.

7. The process of claim 1, wherein, a quench fluid is introduced into the second reaction zone to moderate the temperature.

8. The process of claim 1, wherein, in the second reaction zone, the residence time is 0.2 to 10 seconds.

9. The process of claim 1, wherein, the third reaction zone comprises one or more reactors.

10. The process of claim 9, wherein, one or more catalysts comprises alumina, titanium, or cobalt, molybdenum (Co/Mo) are used in the third reaction zone reactors.

11. The process of claim 1 in which greater than 80% elemental sulfur recovery efficiency can be achieved and the overall recovery from all 3 reaction zones greater than 90% sulfur recovery from the waste stream effluent can be achieved.

12. The process of claim 1, wherein in the first reaction zone, one or more of the gaseous hydrocarbon stream, gaseous oxygen-containing stream, and the $SO_2$-containing gas stream enter the reaction furnace burner after a preheating step wherein the gases are preheated to a temperature of from 150° C. to 350° C.

13. The process of claim 1, wherein in the first reaction zone, the sulfur dioxide containing stream comprises $SO_2$ in a molar concentration ranging from about 1 mol % to about 100 mol %.

14. The process of claim 1, wherein in the first reaction zone, the sulfur dioxide containing effluent stream comprises $SO_2$ in a molar concentration ranging from about 25 mol % to about 100 mol %.

15. The process of claim 1, wherein in the first reaction zone, the hydrocarbon containing gas stream comprises one or more hydrocarbons selected from the group consisting of alkanes, alkenes, alkynes, cycloalkanes, aromatic hydrocarbons, and mixtures thereof.

16. The process of claim 1, wherein the rate of the hydrocarbon stream is adjusted such that the mole ratio of hydrogen sulfide to sulfur dioxide in the gaseous-mixture reaction stream ranges from about 2:1 to about 10:1.

17. The process of claim 1, wherein the first elevated temperature is 1100° C. to 1400° C.

18. The process of claim 1, wherein, the tail gas is further processed in a tail gas process or incineration to achieve 100% sulfur recovery efficiency.

19. The process of claim 1, wherein the recovering process comprises cooling the product gas stream in one or more sulfur condensers to condense and recover elemental sulfur from the product gas stream.

20. The process of claim 1, further comprising removing particulate material from the sulfur dioxide-containing stream prior to conveying the stream to a reaction furnace.

* * * * *